United States Patent [19]

Bartl et al.

[11] Patent Number: 4,501,871

[45] Date of Patent: Feb. 26, 1985

[54] PROCESS FOR THE PRODUCTION OF ANHYDRIDE-GROUP- OR CARBOXYL-GROUP-CONTAINING GRAFT COPOLYMERS OF POLYSACCHARIDE ESTERS

[75] Inventors: Herbert Bartl, Odenthal; Heinrich Alberts, Cologne; Klaus Schuster, Leverkusen, all of Fed. Rep. of Germany

[73] Assignee: Bayer Aktiengesellschaft, Leverkusen, Fed. Rep. of Germany

[21] Appl. No.: 563,660

[22] Filed: Dec. 20, 1983

Related U.S. Application Data

[63] Continuation of Ser. No. 325,845, Nov. 30, 1981, abandoned.

[30] Foreign Application Priority Data

Dec. 3, 1980 [DE] Fed. Rep. of Germany ....... 3045487

[51] Int. Cl.$^3$ .................... C08G 63/00; C08L 1/10; C08L 3/06; C08L 5/00
[52] U.S. Cl. .................... 527/313; 527/314; 527/315
[58] Field of Search .............. 526/238.2; 527/313, 527/314, 315

[56] References Cited

U.S. PATENT DOCUMENTS

| | | | |
|---|---|---|---|
| 3,455,853 | 7/1969 | Dekking | 527/312 |
| 3,634,021 | 1/1972 | Bolinger et al. | 527/313 |
| 3,781,232 | 12/1973 | Gaylord | 527/314 |
| 4,358,510 | 11/1982 | Ito et al. | 527/314 |
| 4,417,025 | 11/1983 | Toba et al. | 527/314 |

Primary Examiner—John Kight
Assistant Examiner—Nathan M. Nutter
Attorney, Agent, or Firm—Connolly and Hutz

[57] ABSTRACT

Anhydride-group- or carboxyl-group-containing graft copolymers of vinyl esters and other suitable monomers on polysaccharide esters of (A) a polysaccharide ester of aliphatic $C_1$–$C_5$-mono-carboxylic acids as the graft substrate and (B) a grafted-on monomer mixture of (a) a vinyl ester of a $C_1$–$C_{18}$-monocarboxylic acid and (b) maleic acid anhydride and/or semiesters of maleic acid and/or fumaric acid with aliphatic $C_1$–$C_{14}$-monoalcohols, the ratio by weight of (A) to (B) being from 1:0.1 to 1:2 and the molar ratio of (a) to (b) being from 1:0.5 to 1:3, and a process for producing these graft copolymers.

2 Claims, No Drawings

PROCESS FOR THE PRODUCTION OF ANHYDRIDE-GROUP- OR CARBOXYL-GROUP-CONTAINING GRAFT COPOLYMERS OF POLYSACCHARIDE ESTERS

CROSS REFERENCE TO RELATED APPLICATION

This application is a continuation of application Ser. No. 325,845 filed Nov. 30, 1981 and now abandoned.

This invention relates to graft copolymers of vinyl esters and monomers containing anhydride or carboxyl groups on polysaccharide esters, to their production by radical polymerisation in homogeneous solution and to their use for the production of films, foils or fibres.

Frequent attempts have been made to modify cellulose esters by grafting on side chains or vinyl compounds either with a view to making the cellulose esters more readily processible or to providing them with better service properties.

For example, it is known from German Auslegeschrift No. 1,155,107 that vinyl acetate and other monomers, such as styrene or acrylonitrile, can be grafted onto cellulose derivatives, such as cellulose ethers or cellulose esters, by ionising radiation.

It is of particular interest to produce products which show the favourable mechanical fibre-forming and film-forming properties of cellulose esters, but which in addition contain reactive groups.

One problem which has not yet been satisfactorily solved in this respect, particularly in the case of cellulose acetates, is that their graft products are neither homogeneous nor even compatible in themselves because it is only products of that type which could be expected to have good mechanical properties.

It has now been found that graft polymers of cellulose esters and also graft polymers of other linear polysaccharides, such as graft polymers of amylose, can be obtained by radically polymerising vinyl esters, preferably vinyl acetate, and suitable derivatives of maleic acid and/or fumaric acid in homogeneous solution in the presence of polysaccharide esters.

One particularly important factor in this respect is the ratio of the polysaccharide esters to the monomers to be grafted on and, in their case, the ratio of the maleic acid and/or fumaric acid derivatives and the vinyl esters to one another. The ratio by weight of the polysaccharide fractions to the copolymers to be grafted on should amount to from 1:0.1 to 1:2 and preferably from 1:0.2 to 1:1.

The molar ratio of the maleic acid or fumaric acid derivatives to the vinyl ester should be from 1:0.5 to 1:3 and preferably from 1:1 and 1:2. Maleic acid derivatives are preferred by virtue of their better tendency towards copolymerisation.

Polysaccharide esters of aliphatic $C_1-C_5$-monocarboxylic acids are used as the graft substrate. The preferred polysaccharide esters are acetic esters of cellulose or amylose; in addition to the acetic ester group, the polysaccharide ester may also contain propionic acid and butyric acid groups.

The processes for producing organic cellulose esters of this type have long been known and are described, for example, in Ullmanns Encyklopadie der technischen Chemie (Verlag Urban & Schwarzenberg, Munich-Berlin, 1963), Vol. 5, pages 182 to 201. The cellulose acetates used are, above all, those in which 2 to 3 hydroxyl groups of the basic molecules are esterified and which are normally known as cellulose diacetate and cellulose triacetate.

Cellulose acetobutyrates suitable for use in accordance with the invention contain
  from 40 to 50% by weight of butyric acid groups and
  from 15 to 26% by weight of acetic acid groups,
whilst suitable cellulose acetopropionates contain
  from 50 to 66% by weight of propionic acid groups and
  from 1 to 12% by weight of acetic acid groups.

Suitable vinyl esters are vinyl esters of $C_1-C_{18}$-monocarboxylic acids, for example vinyl acetate, vinyl propionate and vinyl benzoate, vinyl acetate being preferred.

Other unsaturated esters, for example the diesters of maleic acid and fumaric acid as well as acrylic acid or methacrylic acid esters, may also be co-polymerised in small quantities.

Suitable maleic acid and fumaric acid derivatives are maleic acid anhydride and the semiesters of the two acids with aliphatic $C_1-C_{24}$-monoalcohols, preferably with $C_1-C_{10}$-monoalcohols which may optionally contain functional groups, for example with ethanol, n-butanol, 3-hydroxy propionitrile and 2-ethyl hexyl alcohol.

Examples are maleic acid methyl semiester, butyl semiester, ethyl semiester, cyclohexyl semiester, ethyl hexyl semiester, benzyl semiester or semiesters of abietic alcohol and corresponding semiesters of fumaric acid.

Accordingly, the present invention provides anhydride-group- or carboxyl-group-containing graft copolymers of vinyl esters and other suitable monomers on polysaccharide esters, characterised in that they consist of (A) a polysaccharide ester, preferably of cellulose or amylose, with at least one aliphatic $C_1-C_5$-monocarboxylic acid as the graft substrate and (B) a grafted-on monomer mixture of
(a) a vinyl ester of a $C_1-C_{18}$-monocarboxylic acid, preferably vinyl acetate, and
(b) maleic acid anhydride and/or a semiester of maleic acid and/or fumaric acid with an aliphatic $C_1-C_{24}$-monoalcohol, preferably with a $C_1-C_{10}$-monoalcohol.

the ratio by weight of (A) to (B) being from 1:0.1 to 1:2 and preferably from 1:0.2 to 1:1.1, and the molar ratio of (a) to (b) being from 1:0.5 to 1:3 and preferably from 1:1 to 1:2.

The invention also provides a process for the production of these graft copolymers which is characterised in that the monomer mixture is radically polymerised in homogeneous solution in the presence of the graft substrate in the ratio by weight and molar ratios indicated.

Suitable solvents are those which do not enter into any undesirable secondary reactions with maleic acid anhydride. It is preferred to use tert.-butanol, methylene chloride, glacial acetic acid or mixtures thereof. However, it is also possible to use other solvents, such as acetic acid anhydride, acetone and dimethyl formamide, optionally in admixture with the solvents tert.-butanol and methylene chloride.

In the context of the invention, a homogeneous solution is also understood to be a dispersion of the polysaccharide esters and monomers in an aqueous medium where the solvent or the vinyl ester is not homogeneously miscible with water, so that the polysaccharide ester is still present in at least swollen, albeit finely divided, form with the monomers or the solvent.

However, high grafting yields are obtained particularly readily in cases where methylene chloride, tert.-butyl alcohol or glacial acetic acid is used as the solvent.

The initiators used are the usual radical-forming substances, for example organic peroxides, such as lauroyl peroxide and di-tert.-butyl peroxide, peroxydicarbonates, such as diisopropyl peroxydicarbonate, tert.-butyl hydroperoxide and tert.-butyl perpivalate, or readily decomposable azo compounds, such as azodiisobutyronitrile. Polymerisation may, of course, also be initiated by short-wave radiation. The initiators are preferably used in quantities of less than 1% by weight, based on the total quantity of graft base and monomers.

Polymerisation is generally carried out at temperatures in the range of from 10° to 120° C. and is adapted to the corresponding decomposition temperature of the radical former. Other temperature ranges may, of course, also be applied where redox initiators are used and where polymerisation is initiated by ionising radiation. However, polymerisation is preferably initiated by radical-forming peroxides or azo compounds at temperatures in the range of from 20° to 100° C.

Polymerization by the process according to the invention gives very high grafting yields as reflected in the fact that the copolymers of the maleic acid derivatives and vinyl esters, which are insoluble in methylene chloride and which are precipitated as a deposit during polymerisation, remain in homogeneous solution as grafted-on compounds where polymerisation is carried out in the presence of the polysaccharide esters. The high degrees of grafting are also reflected in the fact that the graft products as such are also homogeneous substances, which may be verified very easily from their film properties because the graft products as such give glass-clear films, whereas corresponding mixtures of polysaccharide esters and the ungrafted copolymers give clouded films, occasionally with pronounced island formation, which is attributable to the presence alongside one another of the two incompatible macromolecular substances.

The products according to the invention may readily be processed from solution to form films, foils and fibres characterised by good mechanical properties. For example, fibres of cellulose acetate graft copolymers are more hydrophilic, show greater affinity for basic dyes and a lesser tendency towards electrostatic charging.

The invention is illustrated by the following Examples.

EXAMPLES

I. In a 2-liter stirrer-equipped vessel, into which a gentle stream of nitrogen is continuously introduced (approximately 2 l/h), 160 parts by weight of cellulose 2½ acetate and 21.3 parts by weight of maleic acid anhydride are dissolved, while stirring at 20° C., in a mixture of 640 parts by weight of methylene chloride and 160 parts by weight of tert.-butanol. A solution of 0.2 part by weight of dicyclohexyl peroxydicarbonate in 21 parts by weight of vinyl acetate is then added at 20° C. After stirring for another 10 minutes at 20° C., the internal temperature is increased to 40° C., followed by stirring for another 10 hours under a light nitrogen blanket.

After cooling to 20° C., the clear solution is precipitated by stirring into 3000 parts by weight of petroleum ether (Bp. 60°-70° C.), and the white product precipitated is washed with 1000 parts by weight of petroleum ether and then dried at 70° C.

After drying, 192 parts by weight of graft copolymer are obtained. Completely transparent films are formed from a tetrahydrofuran solution. The intrinsic viscosity (as measured in acetone) amounts to 1.02.

II. The procedure is as described in Example I, except that polymerisation is carried out in the absence of a graft substrate (cellulose 2½ acetate) under otherwise the same conditions. The copolymer of vinyl acetate and maleic acid anhydride is precipitated. 32 parts by weight of the copolymer are obtained after filtration under suction and drying. This may be regarded as proof of the fact that the proportion of vinyl acetate and maleic acid anhydride polymerised in Example I was fully grafted because a clear solution was formed.

III. 100 parts by weight of cellulose 2½ acetate and 53.3 parts by weight of maleic acid anhydride were dissolved as in Example I in a mixture of 640 parts by weight of methylene chloride and 160 parts by weight of tert.-butanol. After the addition of a solution of 0.5 part by weight of dicyclohexyl peroxydicarbonate in 52 parts by weight of vinyl acetate, the reaction mixture was stirred for 10 minutes at 20° C. and polymerised for 10 hours at 40° C. After precipitation with petroleum ether and drying, 184 parts by weight of graft copolymer having an intrinsic viscosity of 1.35 (as measured in acetone) were obtained.

IV. The procedure was as in Example III using as the graft substrate 100 parts by weight of a cellulose acetopropionate having a propionic acid content of 57.4% by weight, an acetic acid content of 5.7% and an OH-number of 56.3.

187 parts by weight of graft copolymer having an intrinsic viscosity of 1.43 (as measured in acetone) were obtained.

V. 160 parts by weight of the cellulose acetobutyrate described in Example IV and 54 parts by weight of maleic acid-n-butyl semiester were dissolved in 800 parts by weight of methylene chloride. After complete dissolution, a solution of 0.5 part by weight of dicyclohexyl peroxydicarbonate in 33 parts by weight of vinyl acetate was added at 20° C. The mixture was then stirred first for 10 minutes at 20° C. and then for 10 hours at 40° C.

After precipitation in 3000 parts by weight of petroleum ether followed by drying at 70° C., 221 parts by weight of graft copolymer were obtained. The intrinsic viscosity (as measured in acetone) amounted to 1.19. Glass-clear films were formed by drying from tetrahydrofuran solution. After storage in water at 20° C. for 48 hours, none of the films showed any visible changes nor any increase in weight through the absorption of water.

VI. 160 parts by weight of cellulose triacetate and 54 parts by weight of maleic acid-n-butyl ester were dissolved as in Example V in a mixture of 900 parts by weight of methylene chloride and 50 parts by weight of tert.-butanol. The further procedure was then as in Example V. 205 parts by weight of graft copolymer were obtained after drying.

VII. A mixture of 55 parts by weight of the semiester formed from maleic acid anhydride and 3-hydroxy propionitrile and 33 parts by weight of vinyl acetate was grafted onto 160 parts by weight of cellulose triacetate under otherwise the same reaction conditions as described in Example VI. 239 parts by weight of graft copolymer were obtained.

We claim:

1. A process for producing a graft copolymer which comprises radically polymerizing in homogeneous solution 0.1 to 2 parts by weight of a monomer mixture of
   (a) 1 mole of a vinyl ester of a $C_1$–$C_{18}$-monocarboxylic acid and
   (b) from 0.5 to 3 moles of maleic acid anhydride and/or a semiester of maleic acid and/or fumaric acid with aliphatic $C_1$–$C_{24}$-monoalcohols in the presence of one part by weight of a polysaccharide ester of an aliphatic $C_1$–$C_5$-monocarboxylic acid and in the presence of a catalytic amount of a radical initiator selected from the group consisting of organic peroxides, peroxydicarbonates, readily decomposable azo compounds and short-wave radiation.

2. The process of claim 1 wherein the solvent for said homogeneous solution is at least one member selected from the group consisting of tert.-butanol, methylene chloride and glacial acetic acid.

* * * * *